US012585709B1

(12) United States Patent
Mandal et al.

(10) Patent No.: US 12,585,709 B1
(45) Date of Patent: Mar. 24, 2026

(54) PREEMPTIVE ENTROPY REDUCTION IN VECTOR EMBEDDINGS TO ENHANCE SEMANTIC SEARCH

(71) Applicant: INTUIT INC., Mountain View, CA (US)

(72) Inventors: Sumangal Mandal, Bangalore (IN); Vaishali Gupta, Bangalore (IN); Amit Kaushal, Bangalore (IN)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/195,369

(22) Filed: Apr. 30, 2025

(51) Int. Cl.
*G06F 16/93* (2019.01)
*G06F 16/22* (2019.01)
*G06F 40/131* (2020.01)

(52) U.S. Cl.
CPC .......... *G06F 16/93* (2019.01); *G06F 16/2237* (2019.01); *G06F 40/131* (2020.01)

(58) Field of Classification Search
CPC ...... G06F 40/279; G06F 40/284; G06F 40/30; G06F 16/632; G06F 16/638; G06F 16/93; G06F 17/18; G06F 40/205; G06F 40/131; G06F 16/2237; G06F 40/117; G06N 3/045; G06N 20/00
See application file for complete search history.

(56) References Cited

U.S. PATENT DOCUMENTS 12,253,973 B1 * 3/2025 Gavankar ............ G06F 16/152
12,530,916 B2 * 1/2026 Rimchala ............ G06V 30/413
2021/0224264 A1 * 7/2021 Barve ...................... G06N 3/09
2025/0053735 A1 * 2/2025 Shevchenko ........... G06F 40/30
2025/0103640 A1 * 3/2025 Dicklin ............... G06F 16/3334
2025/0225400 A1 * 7/2025 Gross ....................... G06N 3/09

OTHER PUBLICATIONS

Beyer et al., "Embedding Space Correlation as a Measure of Domain Similarity", Proceedings of the 12th Conference on Language Resources and Evaluation (LREC 2020), pp. 2431-2439, May 11-16, 2020.

Gursoy et al., "Alignment and Stability of Embeddings: measurements and inference improvement", arXiv:2101.07251v1 [cs:LG], 24 pages, Jan. 18, 2021.

Kotkov et al., "Cross-Domain Recommendations with Overlapping Items", In Proceedings of the 12th International Conference on Web Information Systems and Technologies (WEBIST 2016), vol. 2, pp. 131-138, 2016.

* cited by examiner

*Primary Examiner* — Marcin R Filipczyk
(74) *Attorney, Agent, or Firm* — DLA PIPER LLP US

(57) ABSTRACT

At least one processor may receive documents and a set of validation prompts, segment the documents into chunks, embed the chunks into a vector space, query a large language model (LLM) with the validation prompts, intercept chunk retrievals from the vector space in response to the validation prompts, map the retrieved chunks to their positions within the documents, calculate document coverage for the retrieved chunks, generate a report of the document coverage, and refine at least one of the validation prompts, document segmentation, or embedding process in response to the report to reduce entropy in the vector space.

18 Claims, 9 Drawing Sheets

PREEMPTIVE ENTROPY REDUCTION IN VECTOR EMBEDDINGS TO ENHANCE SEMANTIC SEARCH

BACKGROUND

Vector embeddings have become a cornerstone of modern natural language processing and information retrieval systems. These numerical representations of data capture semantic relationships, allowing similar content to have closer embeddings in vector space. Semantic search systems leverage these embeddings to match queries with relevant content based on meaning rather than exact keyword matches. In Retrieval Augmented Generation (RAG) systems, documents are prepared for use by chunking and embedding, with each chunk having its own vector representation. When a user query is processed, chunks are retrieved based on vector similarity and passed to a Large Language Model (LLM) to generate a response.

However, current approaches to managing vector embeddings in semantic search systems face several challenges, particularly in multi-domain environments. The current state of the art focuses on measuring and managing existing overlaps in vector spaces and analyzing domain similarities using embedding space correlations. These approaches typically address issues after they have already impacted the system, often relying on post-hoc analysis to improve search accuracy and data quality. When building large RAG platforms across multiple domains, measuring quality and impact between domains becomes difficult. As the volume of indexed content grows, maintaining the quality and relevance of search results becomes more challenging. These limitations can result in suboptimal search accuracy, reduced efficiency, and difficulties in scaling semantic search systems to handle large and diverse datasets.

SUMMARY

Embodiments disclosed herein solve the aforementioned technical problems and may provide other technical solutions as well. Contrary to conventional techniques, the disclosed solution includes a novel method and system for implementing preemptive entropy reduction in vector embeddings to enhance semantic search accuracy and efficiency. The system proactively identifies and mitigates potential outliers in vector spaces before they impact search performance, enabling more precise information retrieval particularly in multi-domain environments. By analyzing document coverage, calculating entropy metrics, and iteratively refining prompts, chunking strategies, and embedding processes, the system significantly improves the quality and relevance of search results while maintaining clear boundaries between different subject matter domains.

A method for preemptive entropy reduction in vector embeddings to enhance semantic search, comprising receiving, by at least one processor, documents and a set of validation prompts, segmenting, by the at least one processor, the documents into chunks, embedding, by the at least one processor, the chunks into a vector space, querying, by the at least one processor, a large language model (LLM) with the validation prompts, intercepting, by the at least one processor, chunk retrievals from the vector space in response to the validation prompts, mapping, by the at least one processor, the retrieved chunks to their positions within the documents, calculating, by the at least one processor, document coverage for the retrieved chunks, generating, by the at least one processor, a report of the document coverage, and refining, by the at least one processor, at least one of the validation prompts, document segmentation, or embedding process in response to the report to reduce entropy in the vector space.

A system for preemptive entropy reduction in vector embeddings to enhance semantic search, comprising an LLM server, a database server, a processing server configured to receive documents and a set of validation prompts, segment the documents into chunks, embed the chunks into a vector space, transmit the validation prompts to the LLM server configured to process the validation prompts and generate queries for retrieving the chunks from the database server, intercept chunk retrievals from the database server in response to the LLM server queries, map the retrieved chunks to their positions within the documents, calculate document coverage for the retrieved chunks, generate a report of the document coverage, and refine at least one of the validation prompts, document segmentation, or embedding process in response to the report to reduce entropy in the vector space, and a user interface configured to display the report and receive refinement inputs.

BRIEF DESCRIPTION OF THE DRAWINGS

So that the present disclosure can be understood in detail, a more particular description of the disclosure, briefly summarized above, may be made by reference to example embodiments, some of which are illustrated in the appended drawings. It is to be noted, however, that the appended drawings illustrate only example embodiments of this disclosure and are therefore not to be considered limiting of its scope, for the disclosure may apply to other equally effective example embodiments.

DETAILED DESCRIPTION OF SEVERAL EMBODIMENTS

Figure 1:
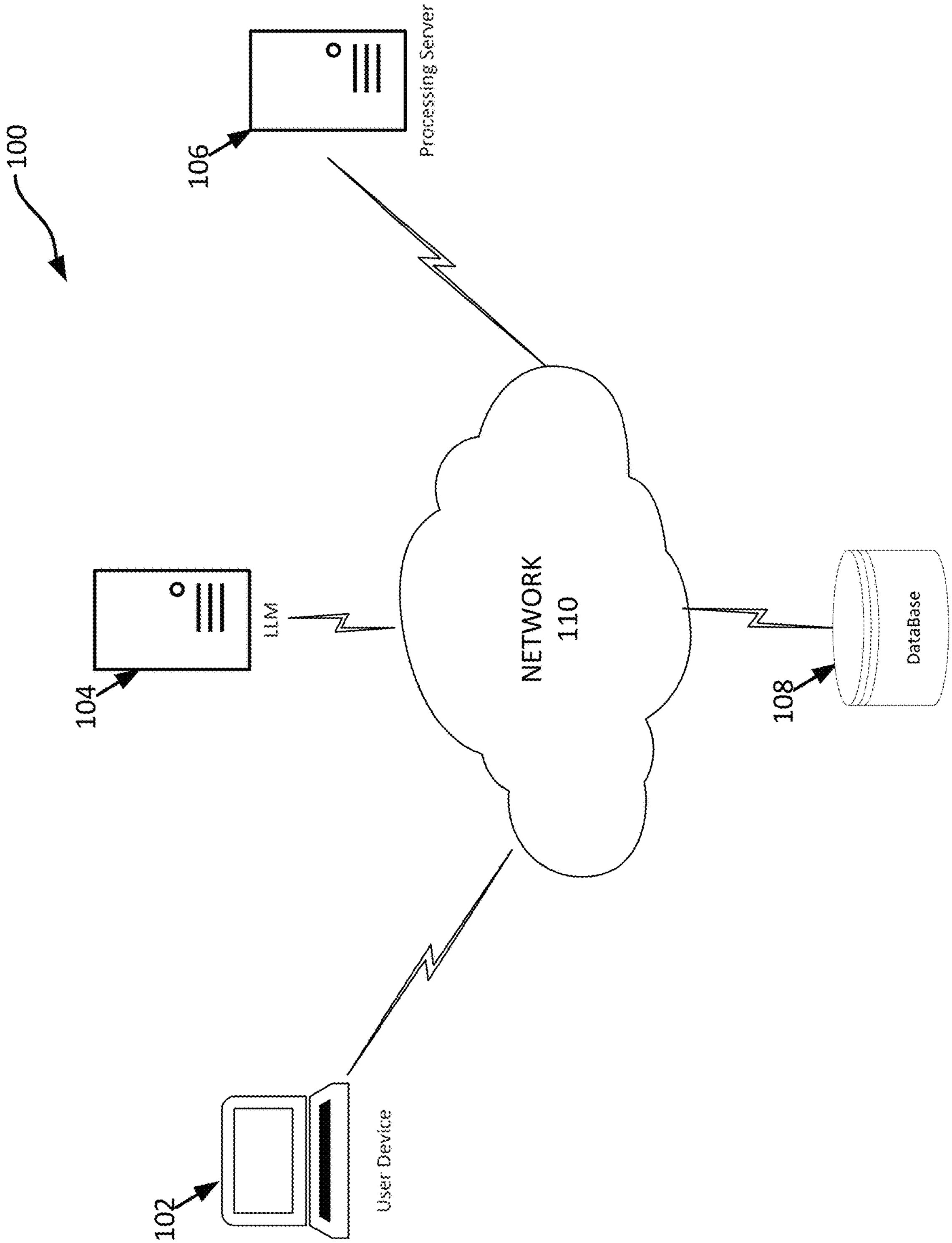
FIG. 1 illustrates a network system for processing and retrieving information, according to aspects of the present disclosure.

The present disclosure relates to systems and methods for preemptive entropy reduction in vector embeddings to enhance semantic search. The system may improve the quality and relevance of search results by proactively identifying and mitigating potential outliers in vector spaces before they impact the system. This approach may lead to more accurate and efficient information retrieval, particularly in large-scale enterprise knowledge management systems.

In an example use case, a team of tax experts and data scientists at a large tax preparation company may implement this system to optimize their tax information retrieval platform. A goal is to enhance the accuracy and efficiency of tax-related queries for both taxpayers and tax preparers. The team may begin by ingesting a vast array of tax documents into the system, including tax codes, regulations, IRS publications, and frequently asked questions. These documents may be processed and segmented into chunks using a set of validation prompts which may simulate common tax-related queries covering various aspects of tax preparation, such as deductions, credits, filing status, and income reporting. The system may then query the LLM with these expert-provided prompts, which generates actual responses. The system may analyze entropy in vector embeddings by comparing the actual LLM responses with the expert-expected responses, which may reveal areas where the system's performance can be improved, such as discovering certain tax concepts are underrepresented in the vector space, or that some chunks are too large and contain mixed information about different tax topics. Based on these insights, the tax experts and the system may collaboratively adjust the prompts, the document chunking strategy to create more granular segments for complex tax topics while maintaining larger chunks for simpler concepts, and the embedding process may be fine-tuned to better capture the nuances of tax terminology and relationships between different tax rules.

Throughout this optimization process, the system analyzes document coverage and compares expert-expected responses with those actually generated by the LLM to quickly identify areas where the system's performance falls short of expert expectations. The tax experts may evaluate these comparisons and make targeted improvements to the prompts, chunking strategies, and embedding processes. This iterative refinement process continues until both the coverage entropy metrics and the expert manual evaluations indicate increased (i.e. optimal) performance. In some cases, the system may identify certain documents or document chunks that consistently contribute to reduced performance or cause cross-domain interference. These problematic documents may be flagged for review and potentially removed from the vector space if they are determined to be unhelpful or detrimental to the overall system performance. The removal process may involve careful analysis to ensure that valuable information is not lost while addressing issues such as outdated content, redundant information, or documents that create confusion between different domains. By selectively pruning the document corpus, the system may improve the clarity and relevance of the vector space, potentially leading to more accurate and efficient semantic search results across multiple domains. This approach may be particularly useful in scenarios were maintaining clear boundaries between different subject matter areas or eliminating unhelpful information beneficial for the system's effectiveness.

After several iterations of refinement, the optimized system may be deployed for use by taxpayers and tax preparers, with improved vector embeddings, chunking strategy, and prompts resulting in more accurate and relevant responses to tax-related queries. For example, when a taxpayer asks, "What deductions can I claim for my home office?", the system may now more accurately retrieve relevant chunks of information from various IRS publications and tax codes, providing a comprehensive response that covers eligibility criteria, calculation methods, and recent updates to home office deduction rules. Similarly, a tax preparer using the system to research a complex issue about foreign income reporting may receive more precise and contextually relevant information, with the system better understanding the nuances of international tax law and providing accurate guidance on reporting requirements, tax treaties, and applicable credits. This preemptive entropy reduction approach may allow the system to maintain high performance even as tax laws change and new documents are added to the knowledge base, and by continuously analyzing and optimizing the vector space, the system may adapt to new information without degrading the quality of responses for existing topics, significantly improving the user experience for both taxpayers and tax preparers by reducing the time needed to find accurate tax information, decreasing errors in tax preparation, and ultimately leading to more confident and compliant tax filing.

FIG. 1 illustrates a network system 100 for processing and retrieving information. The network system 100 may include a user device 102, LLM 104, a processing server 106, a database server 108, and a communication network 110.

The user device 102 may be any computing device capable of interacting with the network system 100, such as a desktop computer, laptop, tablet, or smartphone. In some cases, the user device 102 may send requests and receive responses through the communication network 110.

The LLM 104 may be a natural language processing model designed to understand and generate human-like text. In some cases, the LLM 104 may process prompts, analyze context, and generate relevant responses based on the information available in the system.

The processing server 106 may be responsible for managing the flow of information within the network system 100. In some cases, the processing server 106 may handle tasks such as document segmentation, embedding generation, and entropy analysis.

The database server 108 may store and manage the vector representations of document chunks, as well as other relevant data for the system. In some cases, the database server 108 may facilitate efficient retrieval of information based on similarity searches in the vector space.

The communication network 110 may enable data exchange between the components of the network system 100. In some cases, the communication network 110 may include various types of networks, such as local area networks (LANs), wide area networks (WANs), or the internet.

In operation, a user may interact with the network system 100 through the user device 102, sending prompts for information. These prompts may be processed by the LLM 104, which may generate appropriate responses based on the information stored in the database server 108. The processing server 106 may manage the flow of information, performing tasks such as document analysis, chunk retrieval, and entropy reduction to optimize the system's performance.

The user device 102 within the network system 100 may represent different users depending on the stage of system development and deployment. In some cases, the user device 102 may represent a device utilized by subject matter experts during the training and optimization phase of the system, allowing these experts to interact with the system, provide validation prompts, review responses, and make refinements to improve performance prior to launch. In other cases, once the system has been optimized and deployed, the user device 102 may represent a device used by end users to access the semantic search capabilities, submit prompts, and receive relevant information retrieved by the system. This representation of the user device 102 accommodates both expert interaction during system optimization and end-user engagement during operational deployment within the network system 100. Of course, in practice there may be numerous user devices communicating with the system.

The network system 100 may employ a star topology or the like, with the communication network 110 serving as a central connection point for the user device 102, LLM 104, processing server 106, and database server 108. This configuration may allow for direct communication paths between all connected components through the communication network 110, facilitating efficient data exchange and system operation.

Figure 2:
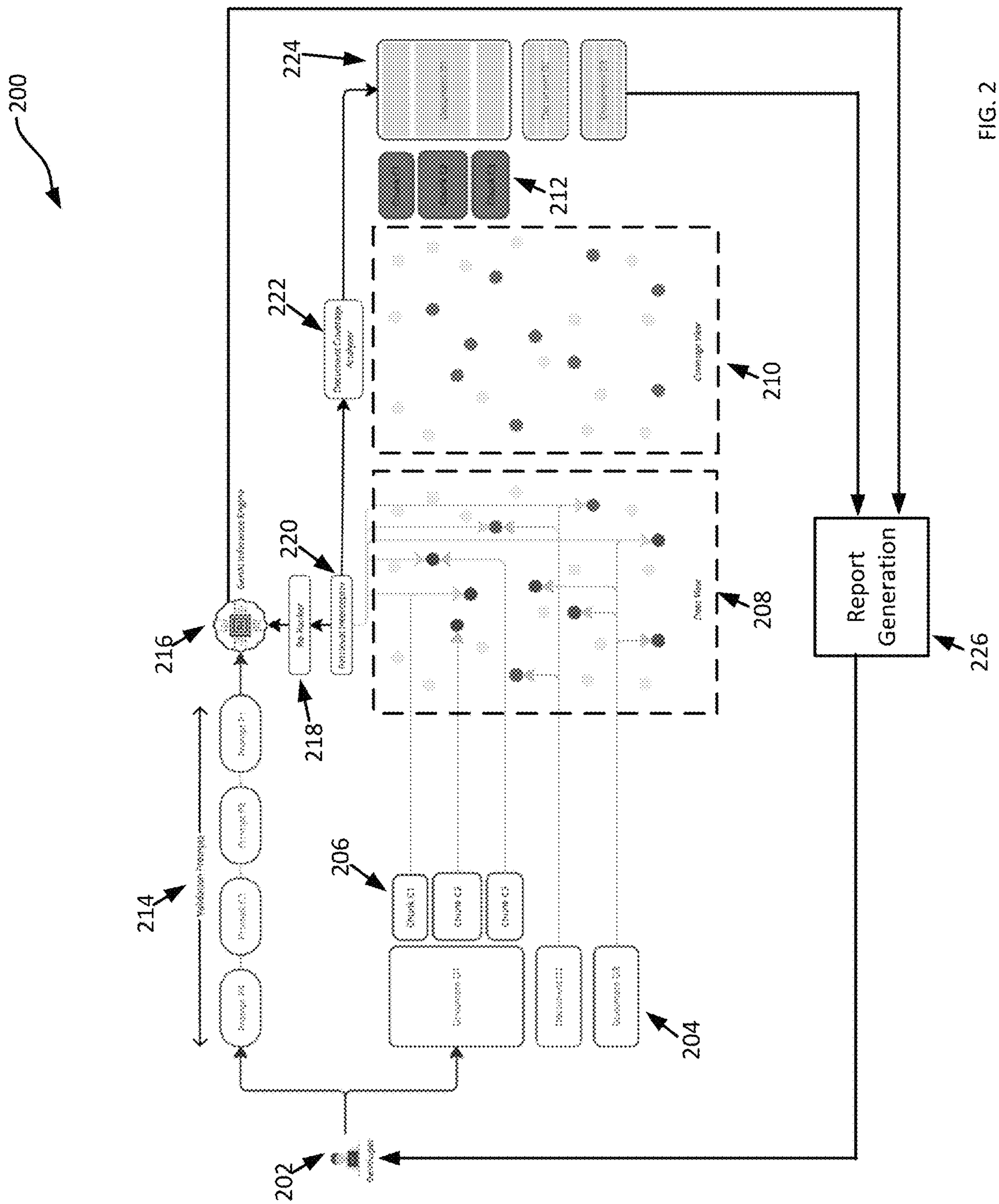
FIG. 2 illustrates a system architecture for preemptive entropy reduction in vector embeddings, according to aspects of the present disclosure.

FIG. 2 illustrates a system architecture 200 for preemptive entropy reduction in vector embeddings to enhance semantic search. The system architecture 200 may include various components and modules designed to process documents, analyze their content, and generate insights for improving semantic search capabilities.

A developer interface 202 may be provided as part of the system architecture 200. The developer interface 202 may allow a developer (e.g., subject matter expert) to interact with the system, input documents, set parameters, generate validation prompts with expected LLM responses, and view results including entropy reports. In some cases, the developer interface 202 may be a graphical user interface accessible through the user device 102.

The system architecture 200 may include a document repository 204. The document repository 204 may store source documents that are to be processed and analyzed by the system. In some cases, the document repository 204 may be implemented as part of the database server 108.

Document chunks 206 may be created by segmenting the source documents from the document repository 204. The document chunks 206 may represent smaller, manageable portions of the original documents that can be processed more efficiently. In some cases, the processing server 106 may be responsible for creating the document chunks 206.

A data chunk visualization 208 may display the distribution and relationships between the document chunks 206. This visualization can help the reader understand how the documents have been segmented and how the chunks relate to each other. The system architecture 200 may include an LLM selected data chunk coverage visualization 210 showing which LLM selected chunks 212 are actually retrieved from the documents in response to specific validation prompts. The LLM selected chunks 212 may represent the portions of the documents that the LLM 104 deems most relevant to a given validation prompt.

A set of validation prompts 214 with corresponding expected LLM responses may be created by subject matter experts and provided to the LLM 216 for processing. The validation prompts 214 may be carefully crafted prompts designed to test the system's ability to retrieve relevant information. In some cases, the processing server 106 may transmit the validation prompts 214 to the LLM 216 for processing.

The LLM 216 may process the validation prompts 214 and generate queries to extract chunks from the vector space that are relevant to the validation prompts. In some cases, the LLM 216 may be implemented as part of the LLM 104 in the network system 100.

In other words, the validation prompts may be processed by the LLM, which can generate database queries based on the prompts. The queries, in turn, can be used to retrieve relevant chunks of information from the vector space. This two-step process allows for consistent input to the LLM via validation prompts, while leveraging the LLM's capabilities to generate more sophisticated, context-aware queries for searching the vector database.

In addition, a re-ranker 218 may be included in the system architecture 200. The re-ranker 218 may refine the relevance ordering of retrieved chunks from database server 108 based on additional criteria or algorithms. This may help improve the accuracy and relevance of the retrieved information before being processed by the LLM 216.

The system architecture 200 may also include a retrieval interceptor 220. When the LLM 216 receives validation prompts 214, it generates queries to retrieve relevant chunks from the database server 108. The retrieval interceptor 220 may capture and monitor the chunks as they are being sent from the database server 108 to the LLM 216. In some cases, the processing server 106 may use the retrieval interceptor 220 to track and analyze which specific chunks are being retrieved in response to each validation prompt.

A coverage analyzer 222 may be part of the system architecture 200. The coverage analyzer 222 may compare the extracted chunks to the original documents to determine document coverage 224 and entropy. The document coverage 224 may provide insights into how well the system is utilizing the available information in the documents.

The system architecture 200 may include a report generator 226 based on the output of the coverage analyzer 222. For example, the report generator 226 may compile information about chunk usage, coverage metrics, entropy analysis, and potential improvements to the system. In some cases, the report generator 226 may also generate a comparison between the expected LLM responses created by the subject matter expert and actual LLM responses sent by the LLM 216 to the report generator 226 for evaluation purposes.

In terms of hardware, the processing server 106 may be responsible for various tasks within the system architecture 200. The processing server 106 may receive documents and a set of validation prompts with expected responses, segment the documents into chunks, and embed the chunks into a vector space. In some cases, the processing server 106 may use algorithms to determine increased (i.e. optimal) chunk sizes and preserve metadata linking chunks to their source documents.

In other words, after the LLM 216 processes the validation prompts 214 and extracts relevant chunks, the processing server 106 may map the retrieved chunks to their positions within the original documents. This mapping process may help in understanding the context and relevance of the retrieved information. The processing server 106 may calculate document coverage and entropy based on the retrieved chunks 212. This calculation may involve determining the percentage of each document covered by the retrieved chunks, identifying the retrieval frequency of different chunks, and analyzing the distribution of retrieved chunks across the documents 224.

Based on the analysis and insights generated by the system, the processing server 106 may automatically refine at least one of the validation prompts, document segmentation, or embedding process. Alternatively, the subject matter expert may use the generated report to make manual adjustments to the prompts, chunking, and vector embeddings. This refinement process may be aimed at reducing entropy in the vector space and improving the overall performance of the semantic search system.

As shown in FIG. 2, system architecture 200 may include a user interface, which may be part of the developer interface 202, configured to display the generated report and receive refinement inputs. This interface may allow subject matter experts to review the system's performance, make informed decisions about potential improvements, and input refinements to the system. This process can be iterated until improved (i.e. optimal) prompts, chunking, and vector embeddings are created, after which the system can be deployed.

In some cases, the system may identify certain documents or document chunks that are outliers or consistently contribute to reduced performance or cause cross-domain interference. These problematic documents may be flagged for review and potentially removed from the vector space if they are determined to be unhelpful or detrimental to the overall system performance. The removal process may involve analysis to ensure that valuable information is not lost while addressing issues such as outdated content, redundant information, or documents that create confusion between different domains. By selectively pruning the document corpus, the system may improve the clarity and relevance of the vector space, potentially leading to more accurate and efficient semantic search results across multiple domains. This approach may be particularly useful in scenarios where maintaining clear boundaries between different subject matter areas or eliminating obsolete information is beneficial for the system's effectiveness.

In the example use case, a large tax preparation software company may implement this system architecture to improve its tax information search and recommendation capabilities. The company may ingest millions of tax forms, IRS publications, tax code documents, and customer tax scenarios into the document repository 204. The system may then process these documents, creating document chunks 206 and embedding them into a vector space.

The company's tax experts and data scientists, acting as subject matter experts, may use the developer interface 202 to create validation prompts 214 with expected responses that simulate typical taxpayer queries. These prompts may be processed by the LLM 216, and the retrieval interceptor 220 may capture the retrieved chunks. The coverage analyzer 222 may then assess how well the system is utilizing the available tax information by comparing the extracted chunks to the original documents. The report generator 226 may produce detailed insights, such as identifying tax topics with low coverage or highlighting frequently retrieved chunks that may benefit from refinement. Based on these insights, the tax experts and/or the system may refine the validation prompts, adjust the document segmentation strategy, or fine-tune the embedding process. This iterative refinement continues until improved (i.e. optimal) performance is achieved.

Through this iterative refinement process, the tax preparation software company may significantly improve its semantic search capabilities, leading to more accurate tax advice recommendations and enhanced taxpayer satisfaction. The system's ability to preemptively reduce entropy in the vector space may result in more efficient use of computational resources and faster query response times, even as tax regulations continue to change and evolve. Once optimized, the system can be deployed for use by taxpayers and tax professionals.

Example methods and algorithms for implementing the preemptive entropy reduction system are described in detail with reference to FIGS. 3-7.

Figure 3:
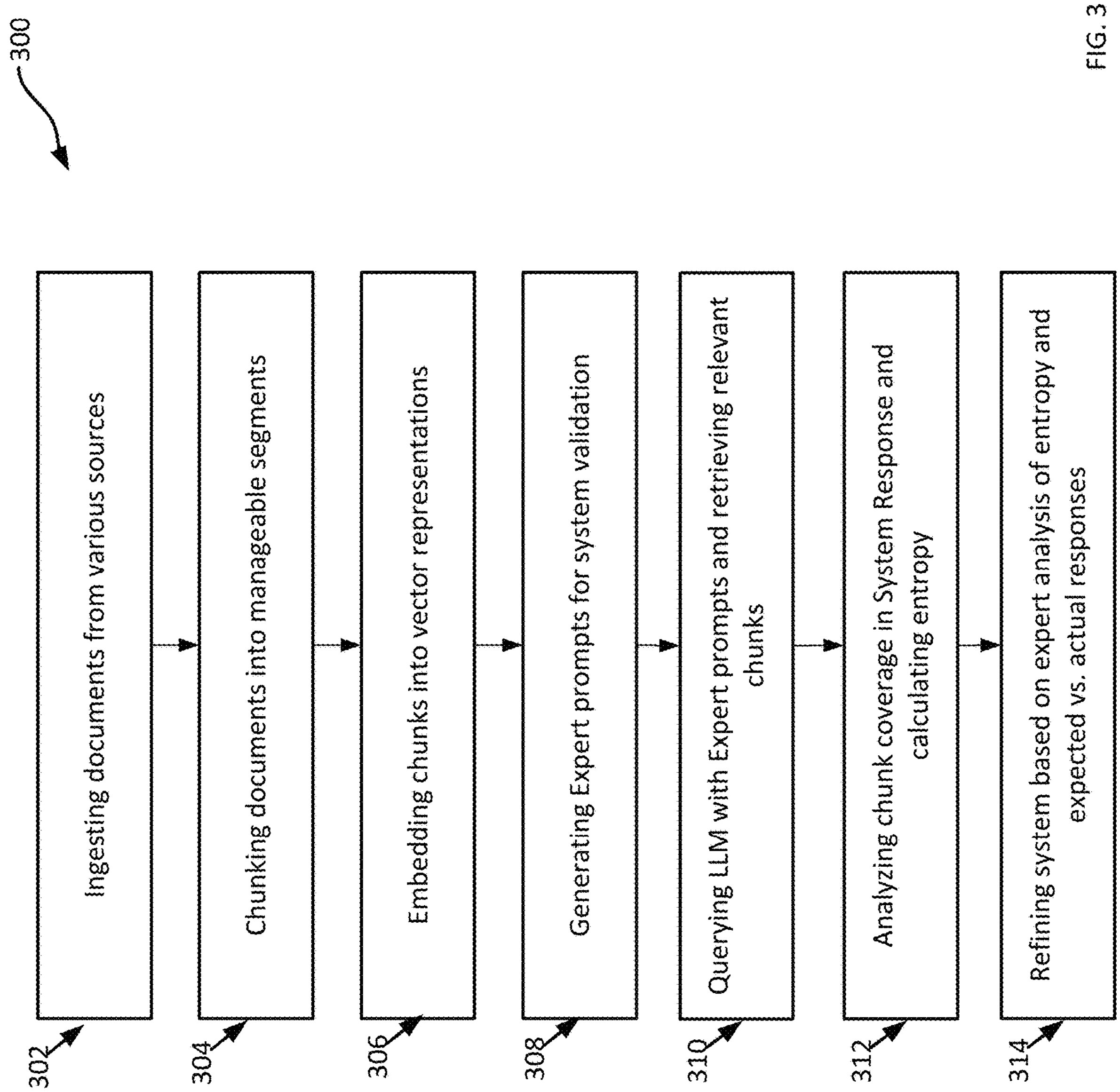
FIG. 3 illustrates an overall flowchart of a method for entropy reduction in vector embeddings, according to aspects of the present disclosure.

FIG. 3 illustrates an overall flowchart of a method 300 for entropy reduction in vector embeddings to enhance semantic search. The method 300 may provide a systematic approach to improve the quality and relevance of search results by proactively identifying and mitigating potential outliers in vector spaces. The method 300 in FIG. 3 includes ingesting documents (step 302), chunking documents (step 304), embedding chunks into vector representations (step 306), generating expert prompts (step 308), querying an LLM with expert prompts and retrieving relevant chunks (step 310), analyzing chunk coverage and calculating entropy (step 312), and refining the system based on expert analysis of entropy and expected versus actual responses (step 314).

The system may begin at 302 ingesting documents from various sources. In some cases, the processing server 106 may receive documents and a set of validation prompts through the developer interface 202. The documents may be stored in the document repository 204 for further processing.

At 304, the process may involve chunking documents into manageable segments. The processing server 106 may analyze the structure and content of each document to determine improved (i.e. optimal) chunk sizes. In some cases, the processing server 106 may preserve metadata linking chunks to their original documents, facilitating later analysis and refinement.

The system may proceed to 306, where the chunks may be embedded into vector representations. The processing server 106 may select an appropriate embedding model and process each chunk to generate vector representations. In some cases, the processing server 106 may normalize the vector representations to ensure consistency across the vector space.

At 308, the system may continue with generating expert prompts (validation prompts) for system validation. The validation prompts 214 may be carefully designed to test the system's ability to retrieve relevant information. In some cases, domain experts may collaborate through the developer interface 202 to create a diverse set of prompts covering various aspects of the document content.

Following the prompt generation, at 310, the system may prompt the LLM 216 with the expert prompts and retrieving relevant chunks. For example, the processing server 106 may transmit the validation prompts 214 to the LLM 216 for processing.

The LLM 216 may generate queries based on the prompts, which may be used to retrieve relevant chunks from the vector space stored in the database server 108.

In some cases, the retrieval interceptor 220 may capture the chunk retrievals from the vector space in response to the LLM-generated queries. This interception may allow for detailed analysis of which chunks are being retrieved for each prompt, providing valuable insights into the system's performance.

The system may then move to 312, where chunk coverage in system response may be analyzed, and entropy may be calculated. The coverage analyzer 222 may map the retrieved chunks to their positions within the original documents. This mapping process may help in understanding the context and relevance of the retrieved information.

In some cases, the coverage analyzer 222 may calculate document coverage based on the retrieved chunks. This calculation may involve determining the percentage of each document covered by the retrieved chunks, identifying the retrieval frequency of different chunks, and analyzing the distribution of retrieved chunks across the documents.

The system may continue at 314 with refining the system based on expert analysis of entropy and expected versus actual responses. The report generator 226 may compile the coverage analysis and entropy calculations into a comprehensive report. This report may include visualizations of metrics and actionable recommendations for system refinement.

Based on the insights provided in the report, the processing server 106 may automatically refine at least one of the validation prompts, document segmentation, or embedding process. Alternatively, or in conjunction with the system, the subject matter expert may use the generated report to make manual adjustments to the prompts, chunking, and vector embeddings. These refinements, whether automatic or guided by expert input, may be aimed at reducing entropy in the vector space and improving the overall performance of the semantic search system.

In the example use case, a large tax preparation company may implement this method to enhance its tax information retrieval system. The company may ingest thousands of tax forms, IRS publications, tax code documents, and customer tax scenarios into the document repository 204. The system may process these documents, creating document chunks 206 and embedding them into a vector space.

The company's tax experts may use the developer interface 202 to create validation prompts 214 that simulate typical taxpayer queries, such as "home office deduction requirements" or "foreign income reporting rules." The LLM 216 may process these prompts, and the retrieval interceptor 220 may capture the retrieved chunks.

The coverage analyzer 222 may assess how well the system is utilizing the available tax information. The report generator 226 may produce detailed insights, such as identifying tax topics with low coverage or highlighting frequently retrieved chunks that may benefit from refinement. Based on these insights, the tax experts may refine the validation prompts, adjust the document segmentation strategy, or fine-tune the embedding process. For example, they may add more specific prompts related to recent tax law changes or adjust the chunking strategy for complex tax code sections to ensure information is not overlooked.

Through iterative refinement using the method 300, the tax preparation company may significantly improve its ability to quickly identify relevant tax regulations, potential deductions, and connections between different tax rules. This enhanced semantic search capability may accelerate the tax preparation process, potentially leading to more accurate tax filings and better service for taxpayers.

Figure 4:
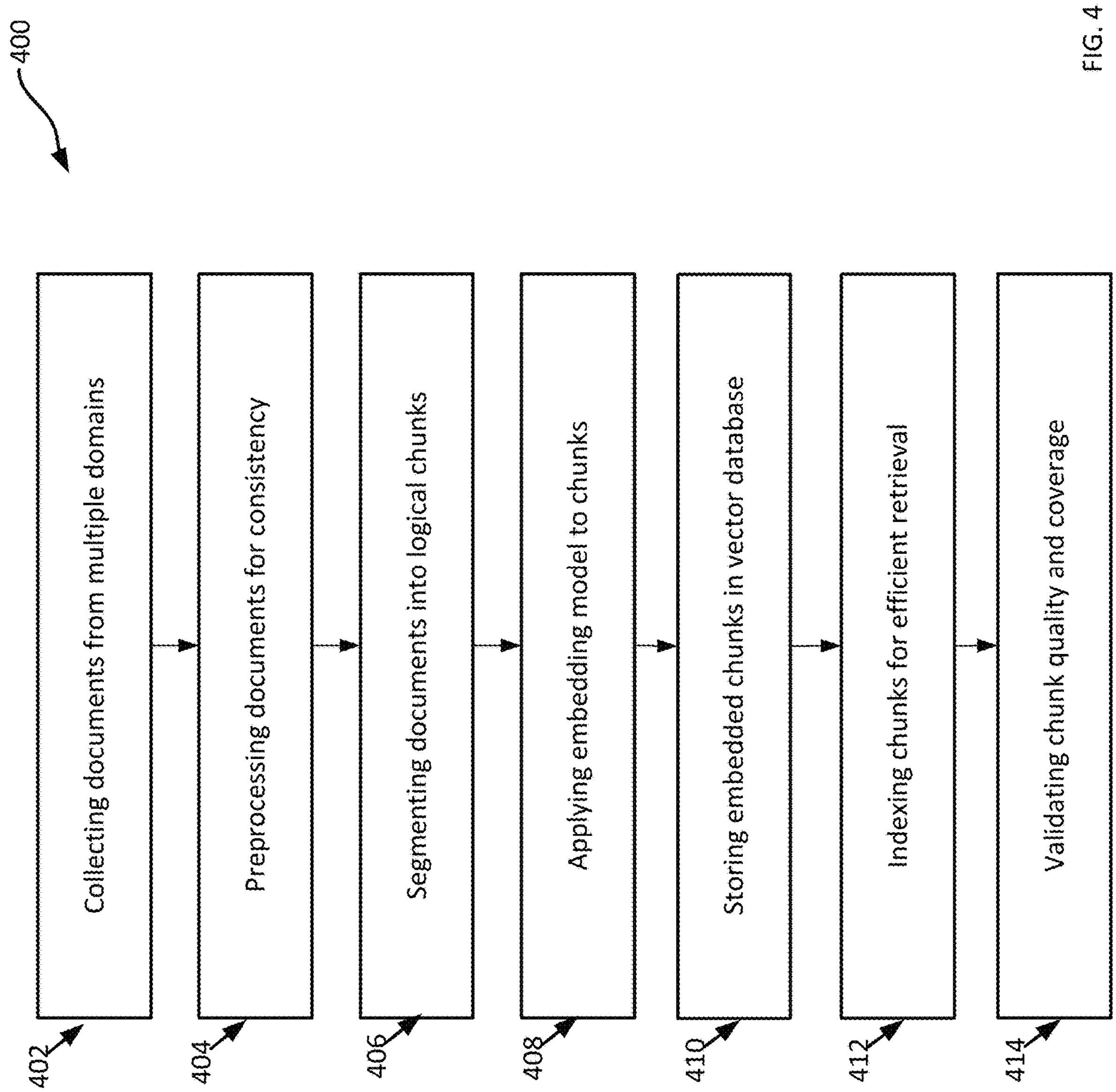
FIG. 4 illustrates a flowchart of a document processing method, according to aspects of the present disclosure.

FIG. 4 illustrates a flowchart of a document processing method 400. The document processing method 400 may prepare documents for semantic search applications by systematically processing and organizing the document content. The document processing method 400 in FIG. 4 includes collecting documents from multiple domains (step 402), preprocessing the documents for consistency (step 404), segmenting documents into logical chunks (step 406), applying an embedding model to the chunks (step 408), storing the embedded chunks in a vector database (step 410), indexing the chunks for efficient retrieval (step 412), and validating chunk quality and coverage (step 414).

The document processing system may begin at 402 of collecting documents from multiple domains. In some cases, the processing server 106 may gather documents from various sources within an organization, such as different departments or external partners. The documents may include a wide range of formats, such as text files, PDFs, spreadsheets, or web pages.

In some cases, the processing server 106 may use web crawlers or APIs to automatically collect documents from specified sources. The processing server 106 may also integrate with existing document management systems to access and retrieve relevant documents.

The document processing system may proceed at 404 to preprocessing the documents for consistency. The processing server 106 may analyze the structure and content of each document to ensure uniformity in format and encoding. In some cases, this preprocessing step may involve converting all documents to a standard format, such as plain text or XML.

The processing server 106 may also perform tasks such as removing formatting artifacts, standardizing character encodings, and normalizing line breaks. In some cases, the processing server 106 may apply natural language processing techniques to identify and correct spelling errors or inconsistencies in terminology.

At 406, the document processing system may segment documents into logical chunks. The processing server 106 may analyze the document structure and content to determine an improved (i.e. optimal) chunk size. In some cases, the improved (i.e. optimal) chunk size may vary depending on the type of document and its content.

For example, the processing server 106 may use different chunking strategies for long-form articles versus short product descriptions. The processing server 106 may consider factors such as paragraph boundaries, section headings, or semantic coherence when defining chunk boundaries. In some cases, the processing server 106 may preserve metadata linking chunks to the document from which they were extracted, facilitating later analysis and refinement.

The document processing system may continue to 408 where an embedding model may be applied to the chunks. The processing server 106 may select an appropriate embedding model based on the nature of the documents and the intended semantic search applications. In some cases, the processing server 106 may use pre-trained models such as BERT or Word2Vec, or may train custom embedding models on domain-specific corpora.

The processing server 106 may process each chunk through the selected embedding model to generate vector representations. These vector representations may capture the semantic meaning of the text, allowing for efficient similarity comparisons in the vector space. In some cases, the processing server 106 may apply additional post-processing techniques to the embeddings, such as dimensionality reduction or normalization.

At 410, the document processing system may store the embedded chunks in a vector database. The processing server 106 may select an appropriate vector database system, such as Faiss, Annoy or the like, based on factors like scalability requirements and query performance needs. In some cases, the processing server 106 may configure the vector database for efficient similarity search operations.

The processing server 106 may store the vector representations of the chunks along with metadata such as the source document identifier and chunk position. In some cases, the processing server 106 may implement indexing strategies to optimize retrieval performance, such as using approximate nearest neighbor algorithms or clustering techniques.

The document processing system may proceed to 412 and index the chunks for efficient retrieval. The processing server 106 may create index structures that allow for fast similarity searches in the vector space. In some cases, this indexing step may involve building tree-based or graph-based data structures that partition the vector space for efficient querying.

The processing server 106 may also generate additional metadata indices to support filtering or faceted search capabilities. For example, the processing server 106 may create inverted indices for terms or attributes associated with the chunks, allowing for rapid narrowing of the search space based on specific criteria.

The document processing system may continue at 414 and validate chunk quality and coverage. The processing server 106 may perform various checks to ensure the processed chunks accurately represent the original document content and provide comprehensive coverage for semantic search applications. In some cases, this validation step may involve statistical analysis of chunk distributions and overlap.

The processing server 106 may also conduct sample queries to assess the retrieval performance of the indexed chunks. In some cases, the processing server 106 may generate reports on chunk quality and coverage, highlighting any potential issues or areas for improvement in the document processing pipeline. These reports may be used to refine the chunking strategy, embedding process, or indexing techniques in subsequent iterations of the document processing method 400.

In the document processing method 400 illustrated in FIG. 4, various technical details may be implemented for each step. At 402, the processing server 106 may utilize web scraping libraries to collect documents from multiple domains. At 404, preprocessing may involve using natural language processing libraries such to standardize text encoding and correct spelling errors. At 406, the processing server 106 may employ algorithms like sentence transformers to segment documents into logical chunks. At 408, the embedding model application may utilize frameworks to generate vector representations using models like BERT or Word2Vec. At 410, the system may use vector database systems to store the embedded chunks efficiently. At 412, indexing may be implemented using algorithms like hierarchical navigable small world (HNSW) or inverted file (IVF) for fast similarity searches. At 414, the validation of chunk quality and coverage may employ statistical measures such as cosine similarity or the like to assess the representativeness of the processed chunks.

Figure 5:
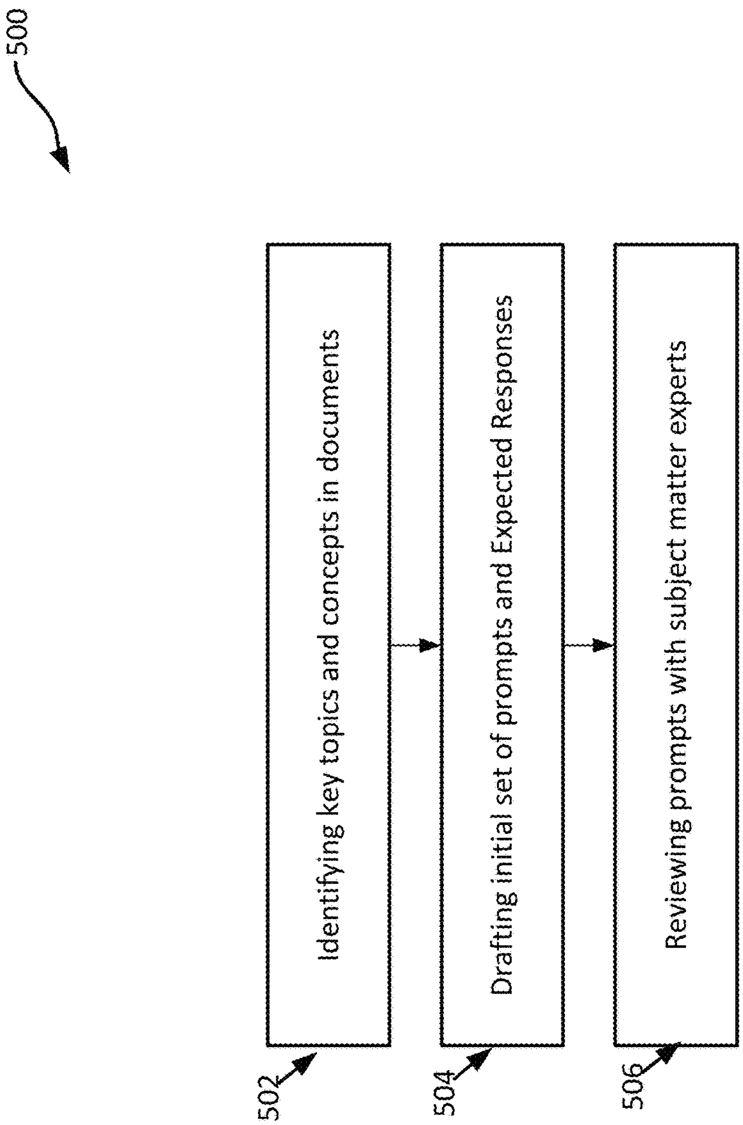
FIG. 5 illustrates a flowchart of a method for validation prompt generation, according to aspects of the present disclosure.

FIG. 5 illustrates a flowchart of a method 500 for validation prompt generation. The method 500 may provide an approach to creating validation prompts for semantic search applications, incorporating both human expertise and automated evaluation. The method 500 in FIG. 5 includes identifying topics and concepts in documents (step 502), drafting an initial set of prompts based on identified topics and concepts (step 504), reviewing drafted prompts with subject matter experts (step 506).

The method 500 may begin at 502, where topics and concepts may be identified in documents. The processing server 106 may analyze the content of documents stored in the document repository 204 to extract themes and subject matter. In some cases, the processing server 106 may use natural language processing techniques such as topic modeling or keyword extraction to identify recurring concepts across the document corpus.

The processing server 106 may also leverage metadata associated with the documents, such as titles, abstracts, or tags, to identify topics. In some cases, the processing server 106 may generate a hierarchical representation of topics, allowing for a structured approach to prompt generation.

The system may proceed to 504, where an initial set of prompts may be drafted based on the identified topics and concepts. The processing server 106 may use various techniques to generate these initial prompts. In some cases, the processing server 106 may employ template-based approaches, where predefined question structures are populated with terms and concepts identified in the previous step.

The processing server 106 may also utilize machine learning models trained on existing query-document pairs to generate relevant prompts. In some cases, the processing server 106 may incorporate domain-specific knowledge bases or ontologies to ensure the generated prompts are contextually appropriate and cover a wide range of potential user queries.

At 506, the system may review the drafted prompts with subject matter experts. The developer interface 202 may present the initial set of prompts to domain experts for evaluation and refinement. In some cases, the experts may assess the relevance, clarity, and coverage of the prompts in relation to the document corpus and intended use cases.

After the subject matter experts review and refine the drafted prompts at 506, these carefully crafted prompts may then be utilized as the validation prompts for input into the system. In some cases, the refined prompts may serve as a comprehensive set of test queries designed to evaluate the system's performance across various topics and scenarios.

In the method 500 illustrated in FIG. 5, various technical implementations may be employed for each step. At 502, the processing server 106 may utilize natural language processing techniques such as Latent Dirichlet Allocation (LDA) or Term Frequency-Inverse Document Frequency (TF-IDF) to identify topics and concepts in documents. At 504, the initial set of prompts may be drafted using techniques like sequence-to-sequence models (e.g., BART or T5) fine-tuned on domain-specific question-answer pairs, or rule-based systems that leverage extracted keywords and predefined templates. At 506, the developer interface 202 may implement collaborative annotation tools, allowing subject matter experts to review, edit, and rate prompts using features like in-line commenting, version control, and sentiment analysis to capture expert feedback efficiently.

In some cases, the validation prompts may be manually generated by the subject matter expert, bypassing the automated prompt generation process. This approach may leverage the expert's deep domain knowledge and understanding of the specific use cases for the semantic search system. The subject matter expert may craft prompts that directly address concepts, common queries, or edge cases within their field of expertise. By manually creating validation prompts, the expert may ensure that the prompts closely align with real-world scenarios and cover aspects of the domain that automated systems might overlook. This manual approach may be particularly valuable in highly specialized or rapidly evolving fields where pre-existing datasets or automated generation techniques may not fully capture the nuances of the subject matter. The manually generated prompts may then be input directly into the system for use in subsequent stages of the semantic search optimization process.

Figure 6:
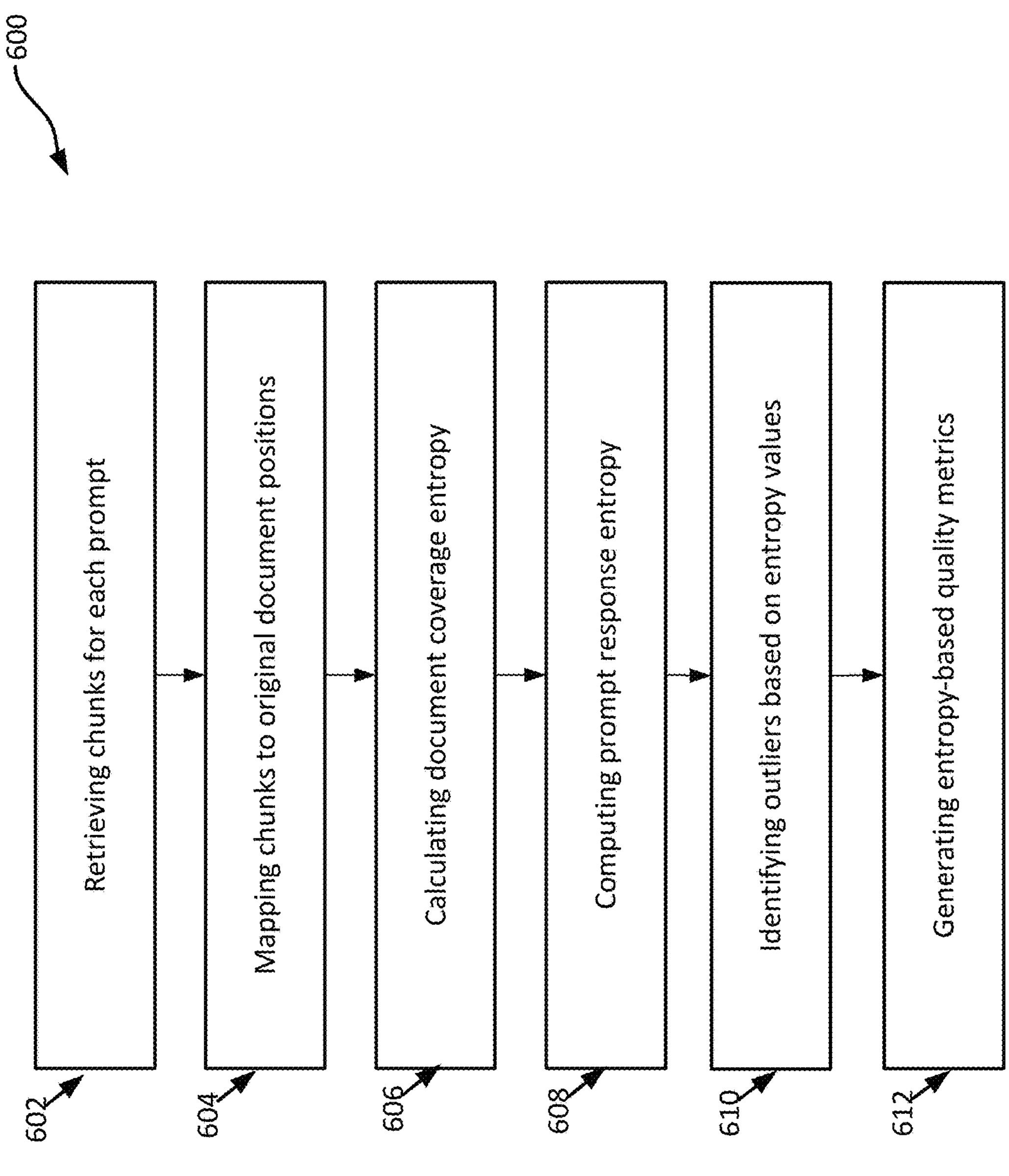
FIG. 6 illustrates a flowchart of a method for analyzing entropy in vector embeddings, according to aspects of the present disclosure.

FIG. 6 illustrates a flowchart of a method 600 for analyzing entropy in vector embeddings. The method 600 may provide a systematic approach to evaluating and optimizing the distribution of information within the vector space, ultimately enhancing the performance of semantic search applications. The method 600 in FIG. 6 includes retrieving chunks for each validation prompt (step 602), mapping chunks to original document positions (step 604), calculating document coverage entropy (step 606), computing prompt response entropy (step 608), identifying outliers based on entropy values (step 610), and generating entropy-based quality metrics (step 612).

The system may begin at 602, which may involve retrieving chunks for each validation prompt. Specifically, the processing server 106 may send the validation prompts 214 to the LLM 216 for processing. The LLM 216 may generate queries based on these prompts, which are then used to retrieve relevant chunks from the vector space stored in the database server 108.

In some cases, the retrieval interceptor 220 may capture and log the retrieved chunks for each prompt. This interception may allow for detailed analysis of which chunks are being retrieved for each prompt, providing valuable insights into the system's performance and the distribution of information across the vector space.

At 604, the system may proceed with mapping chunks to original document positions. The processing server 106 may analyze the metadata associated with each retrieved chunk to determine its source document and precise location within that document. This mapping process may be beneficial for understanding the context and relevance of the retrieved information.

The system may continue to 606, where document coverage entropy may be calculated. The coverage analyzer 222 may determine the percentage of each document covered by the retrieved chunks. This calculation may involve comparing the total length of retrieved chunks from a document to the document's overall length.

In some cases, the coverage analyzer 222 may also identify the retrieval frequency of different chunks, highlighting which portions of documents are frequently retrieved and which are rarely or never accessed. The coverage analyzer 222 may analyze the distribution of retrieved chunks across the documents, providing insights into how evenly or unevenly information is being utilized from the document corpus.

At 608, the system may compute prompt response entropy. The processing server 106 may calculate document entropy with respect to the chunks used in responses for each validation prompt. This entropy calculation may quantify the uncertainty or randomness in the distribution of retrieved chunks for each prompt.

In some cases, the processing server 106 may use information theory principles to compute entropy, considering factors such as the number of unique chunks retrieved, their frequency of retrieval, and their distribution across different documents. Low entropy may indicate that a prompt consistently retrieves similar chunks, while high entropy may suggest a more diverse range of retrieved information.

The system may proceed to 610, which may involve identifying outliers based on entropy values. The processing server 106 may analyze the calculated entropy values to detect documents, chunks, or prompts that exhibit significantly different behavior compared to the overall distribution. In some cases, the processing server 106 may use statistical techniques such as z-score analysis or clustering algorithms to identify outliers. Documents with unusually high or low coverage, chunks that are retrieved much more or less frequently than average or prompts that consistently produce high or low entropy responses may be flagged for further investigation and potential optimization.

The system may continue at 612 with generating entropy-based quality metrics. The report generator 226 may compile the results of the entropy analysis into comprehensive quality metrics that provide insights into the overall performance of the semantic search system. In some cases, these metrics may include aggregate measures such as total system entropy, which may be calculated by aggregating individual document entropies. The report generator 226 may also produce visualizations of entropy distributions, coverage maps, and outlier analyses to facilitate easy interpretation of the results by system administrators or domain experts.

In one example, document entropy may be computed as shown in equation 1 below, where D1 is document 1, $L_{total}$ is total document length and $L_{covered}$ is the covered document length:

$$\text{Entropy}_{D1} = \frac{L_{total} - L_{covered}}{L_{total}} \tag{1}$$

In one example, total system (corpus) entropy may be computed as shown in equation 2 below, where Total Entropy is the total entropy for N documents:

$$\text{Total Entropy} = \frac{\sum_{i=1}^{N} \frac{L_{total} - L_{covered}}{L_{total}}}{N} \tag{2}$$

In the example use case, a large tax preparation company may implement this entropy analysis method to optimize its tax information retrieval system. The company may have a vast repository of tax forms, IRS publications, tax code documents, and customer tax scenarios stored in the document repository 204.

The processing server 106 may apply the method 300 to analyze how effectively the system retrieves relevant information from these documents in response to tax-related queries. The coverage analyzer 222 may calculate the percentage of each tax document covered by retrieved chunks, identifying any sections that are consistently overlooked.

By computing prompt response entropy, the processing server 106 may identify which tax-related queries produce consistent, focused results (low entropy) versus those that yield more scattered, diverse information (high entropy). This analysis may help tax experts refine their search strategies and identify areas where document organization or tagging may benefit from improvement.

The report generator 226 may produce entropy-based quality metrics that highlight potential gaps in coverage of certain tax regulations or inconsistencies in how different tax topics are represented in search results. These insights may guide the tax preparation company in refining its document management practices, updating its validation prompts, and optimizing its semantic search system to ensure comprehensive and efficient access to tax information.

Through iterative application of this entropy analysis method, the tax preparation company may significantly enhance its ability to quickly retrieve relevant tax information, reduce the risk of overlooking tax requirements, and improve overall efficiency in helping taxpayers navigate the complex tax landscape.

In the method 600 illustrated in FIG. 6, various technical implementations may be employed for each step. At 602, the processing server 106 may utilize vector similarity search algorithms such as approximate nearest neighbor (ANN) or cosine similarity to efficiently retrieve relevant chunks from the vector space. At 604, the system may employ inverted indexing techniques or metadata tagging systems to map retrieved chunks back to their original document positions. At 606, the coverage analyzer 222 may use information theory concepts, calculating Shannon entropy or Kullback-Leibler divergence to quantify document coverage. At 608, the processing server 106 may apply techniques like perplexity calculation or cross-entropy analysis to compute prompt response entropy. At 610, the system may implement statistical methods such as Mahalanobis distance or Local Outlier Factor (LOF) to identify outliers based on entropy values. At 612, the report generator 226 may utilize data visualization libraries like D3.js or Plotly to create interactive entropy distribution plots, or employ machine learning techniques such as dimensionality reduction (e.g., t-SNE or UMAP) to visualize high-dimensional entropy data in a more interpretable format.

Figure 7:
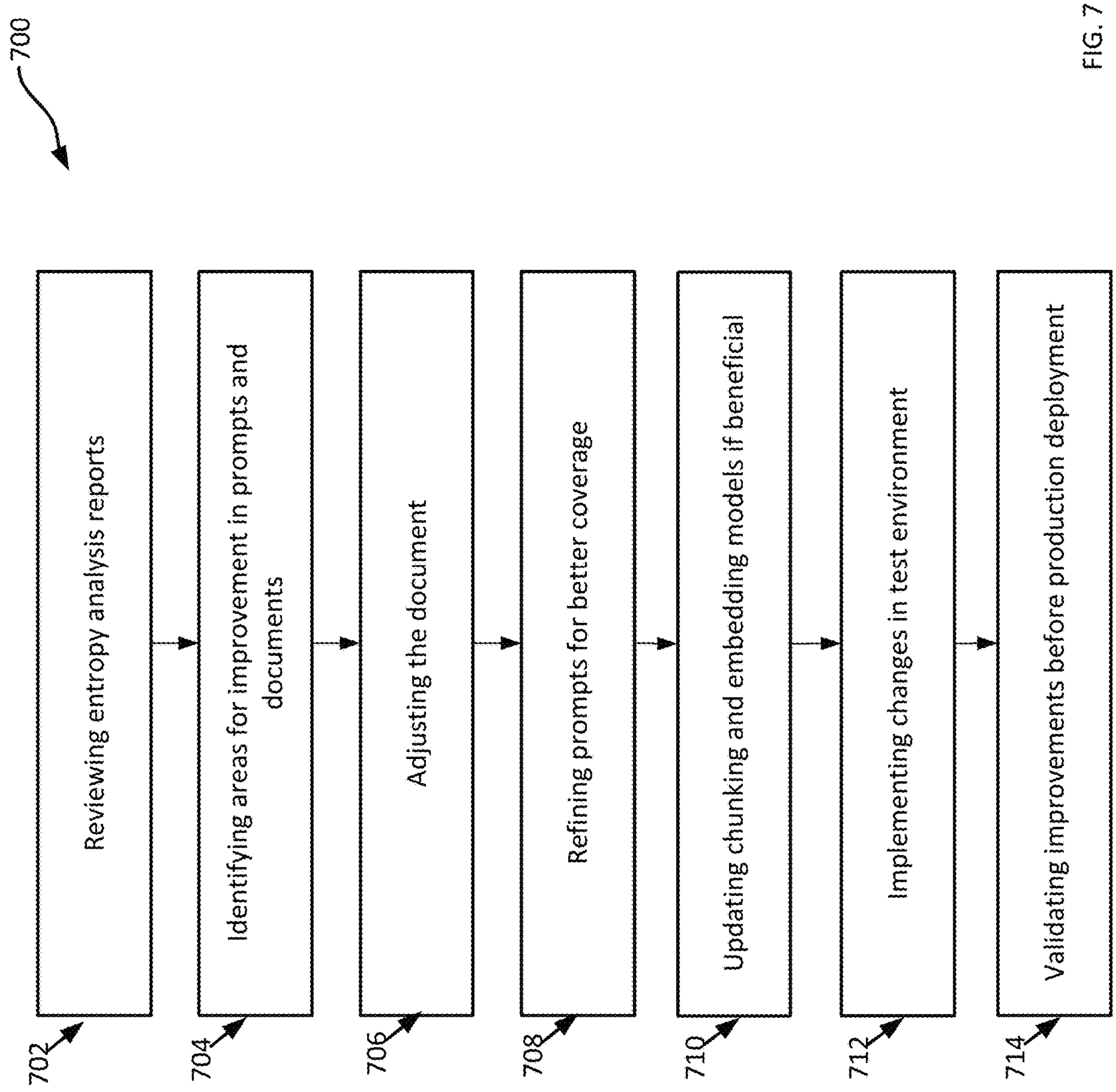
FIG. 7 illustrates a flowchart of a method for refining and optimizing a system based on entropy analysis, according to aspects of the present disclosure.

FIG. 7 illustrates a flowchart of a method 700 for refining and optimizing a system based on entropy analysis. The method 700 may provide a systematic approach to continuously improve the performance of semantic search applications by iteratively refining various components of the system. The method 700 in FIG. 7 includes reviewing entropy analysis reports (step 702), identifying areas for improvement in prompts and documents (step 704), adjusting the document (step 706), refining prompts for better coverage (step 708), updating chunking and embedding models if beneficial (step 710), implementing changes in a test environment (step 712), and validating improvements before production deployment (step 714).

The system may begin at 702 with reviewing entropy analysis reports. The processing server 106 may generate comprehensive reports that include entropy calculations, coverage metrics, and other relevant statistics. In some cases, these reports may be presented through the developer interface 202 for review by domain experts or system administrators.

The processing server 106 may analyze the entropy values for different documents, chunks, and prompts to identify patterns or anomalies. In some cases, the processing server 106 may use visualization techniques to present the entropy data in an easily interpretable format, such as heat maps or scatter plots.

At 704, the system may identify areas for improvement in prompts and documents. Based on the entropy analysis reports, the processing server 106 may highlight specific prompts that consistently produce high or low entropy responses. In some cases, the processing server 106 may also identify documents or sections of documents that are underutilized or overrepresented in search results.

The processing server 106 may use statistical techniques to detect outliers or anomalies in the entropy distributions. In some cases, the processing server 106 may employ machine learning algorithms to identify patterns or correlations between document characteristics, prompt structures, and entropy values.

The system may proceed to 706, where adjusting the document may occur. The processing server 106 may implement changes to the document segmentation strategies based on the identified areas for improvement. In some cases, this may involve modifying the chunk size or boundaries for specific types of documents or content. In other cases, the method may involve removing documents from the database.

The processing server 106 may also update metadata associated with document chunks to improve their relevance and retrievability. In some cases, the processing server 106 may employ natural language processing techniques to enhance the semantic representation of document segments.

At 708, the system may continue with refining prompts for better coverage. The processing server 106 may implement expert-approved changes to prompts received through the user interface. In some cases, this refinement process may involve rephrasing existing prompts, adding new prompts to address identified gaps, or removing redundant or ineffective prompts. This may also include input from a subject matter expert that views the entropy and compares the expected vs. actual responses produced by the LLM.

The subject matter expert may utilize the graphical user interface to view entropy metrics and compare expected versus actual LLM responses. In some cases, the expert may analyze entropy values for different prompts and documents, allowing them to identify areas of high or low entropy that may require attention. The expert may perform side-by-side comparisons of expected and actual LLM responses, enabling the expert to assess the accuracy and relevance of the system's outputs. By examining these comparisons alongside the entropy metrics, the expert may identify patterns or discrepancies that suggest areas for improvement. For instance, prompts with high entropy and significant differences between expected and actual responses may indicate they may benefit from refinement. Based on these insights, the expert may propose changes to prompt phrasing, document segmentation strategies, or embedding processes. The processing server 106 may also use machine learning techniques to generate variations of existing prompts that may yield improved entropy characteristics. In some cases, the processing server 106 may also analyze user query logs to identify common search patterns and incorporate these insights into prompt refinement.

The system may move to 710, which may involve updating chunking and embedding models if beneficial. The processing server 106 may modify the embedding process based on gathered insights from the entropy analysis. In some cases, this may involve fine-tuning the embedding model on domain-specific data or adjusting the dimensionality of the vector representations. Since entropy is directly proportional to the line coverage within documents, with more lines covered resulting in lower entropy, the processing server 106 may optimize chunk size to achieve higher coverage and reduced entropy. The chunk size determines retrieval granularity, with smaller chunks increasing precision but potentially missing context, while larger chunks capture more relationships but may dilute relevance. For example, the processing server 106 may employ adaptive chunking algorithms that dynamically adjust chunk sizes based on document structure, content complexity, and semantic coherence. In some cases, the system may utilize machine learning techniques to analyze historical retrieval patterns and entropy metrics, allowing it to iteratively refine chunking strategies for different document types or subject areas to optimize coverage and relevance. Additionally, the processing server 106 may implement more sophisticated embedding models with higher dimensionality to capture nuanced semantic relationships, thereby improving the accuracy of similarity matching and document coverage. Through these targeted adjustments to both chunking strategies and embedding models, the system can systematically reduce entropy while enhancing the quality of semantic search results.

The processing server 106 may also experiment with different chunking strategies, such as overlapping chunks or variable-length segments, to improve the overall coverage and retrieval performance. In some cases, the processing server 106 may employ adaptive chunking algorithms that adjust segmentation based on document structure and content complexity.

At 712, the system may implement these changes in the test environment. In other words, processing server 106 may create a sandbox or staging environment where the refined prompts, adjusted documents, and updated embedding models can be tested without affecting the production system. In some cases, this test environment may be a scaled-down version of the full system, allowing for rapid iteration and experimentation.

The processing server 106 may run a series of test queries and simulations in the test environment to evaluate the impact of the implemented changes. In some cases, the processing server 106 may use automated testing frameworks to generate a large number of test cases and compare the results against predefined performance benchmarks.

The system may continue at 714 with validating improvements before production deployment. The processing server 106 may re-run the entropy reduction process with refined inputs in the test environment. In some cases, this may involve processing a subset of the document corpus with the updated configurations and comparing the results to previous iterations.

The processing server 106 may assess improvement in entropy and coverage metrics by comparing the new results with those from previous iterations. In some cases, the processing server 106 may use statistical hypothesis testing to determine if the observed improvements are statistically significant.

The processing server 106 may identify areas for further optimization based on the validation results. In some cases, the processing server 106 may generate visualizations and summary statistics for displaying on the user interface, allowing system administrators or domain experts to make informed decisions about production deployment.

In the tax use case, a team of tax experts and data scientists at the large tax preparation company may collaborate closely with the system to optimize its performance using the method outlined in FIG. 7. The process may begin with the tax experts reviewing the entropy analysis reports generated by the system at 702. These reports may provide detailed insights into how well the system retrieves and utilizes tax-related information across various documents and topics.

Based on these reports, the tax experts may identify specific areas for improvement at 704. For example, they may notice that certain tax topics, such as international tax regulations or recent changes in tax laws, consistently produce high-entropy responses, indicating a lack of focused information retrieval. In other cases, they may identify prompts related to common tax deductions that yield low-entropy responses, suggesting that the system may be overlooking potentially relevant information.

The tax experts may then work with the system to adjust document segmentation strategies at 706. They may decide to create smaller, more granular chunks for complex tax topics while maintaining larger chunks for simpler concepts. At 708, the experts may refine the validation prompts by rephrasing existing prompts to better capture the nuances of recent tax law changes.

At 710, the tax experts may collaborate with data scientists to update the chunking and embedding models. They may fine-tune the embedding model on a curated dataset of tax-specific terminology and concepts, potentially improving the system's ability to capture semantic relationships between different tax rules and regulations. The team may also experiment with different chunking strategies, such as creating overlapping chunks for sections of tax code that frequently reference other parts of the document.

Throughout this optimization process, the system may continuously analyze document coverage and compare expert-expected responses with those actually generated by the LLM. This iterative refinement process may continue until both the entropy metrics and the correlation between expected and actual LLM responses reach an acceptable threshold determined by the tax experts.

Once the system demonstrates consistent performance in the test environment (712) and the improvements are validated (714), the optimized tax information retrieval system may be launched for use by taxpayers and tax preparers. The refined system may now provide more accurate and relevant responses to tax-related queries, enhancing the overall user experience and potentially improving the efficiency and accuracy of tax preparation processes.

In the method 700 illustrated in FIG. 7, various technical implementations may be employed for each step. At 702, the processing server 106 may utilize data visualization libraries such as Matplotlib or Seaborn to generate interactive heatmaps and scatter plots of entropy values across documents and prompts. At 704, the system may employ clustering algorithms like K-means or DBSCAN to group similar documents and prompts based on their entropy characteristics. At 706, natural language processing techniques such as named entity recognition or topic modeling may be used to identify concepts within documents and inform segmentation strategies. At 708, the system may leverage generative AI models like GPT-3 or BERT to suggest prompt variations that may improve coverage. At 710, the processing server 106 may experiment with different embedding models such as Word2Vec, GloVe, or BERT, and may use techniques like transfer learning to fine-tune these models on domain-specific data. At 712, the system may utilize containerization technologies like Docker to create isolated test environments, and may employ A/B testing frameworks to compare different system configurations. At 714, the processing server 106 may use statistical analysis tools such as SciPy or statsmodels to perform hypothesis testing and calculate confidence intervals for observed improvements in entropy and coverage metrics.

Figure 8:
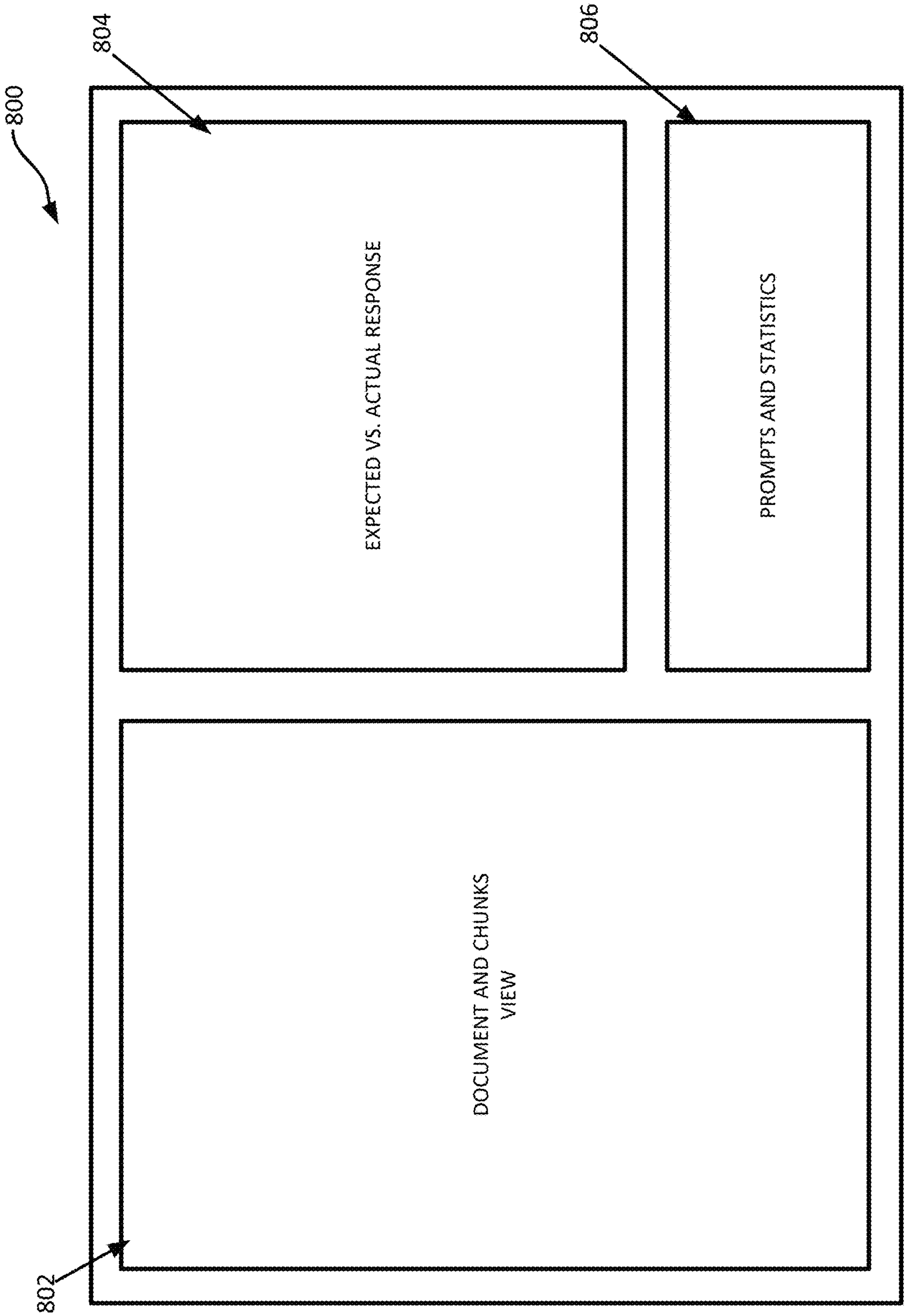
FIG. 8 illustrates a block diagram of a graphical user interface for analyzing document coverage and response comparisons, according to aspects of the present disclosure.

FIG. 8 illustrates a block diagram of a graphical user interface 800 for analyzing document coverage and response comparisons. The graphical user interface 800 may include three main sections: a document view 802, a response comparison view 804, and a statistics view 806.

The document view 802 may display documents and their corresponding chunks, allowing users to visualize how documents have been segmented and processed. In some cases, the document view 802 may present a hierarchical structure of the documents, with expandable sections for each document and its associated chunks. The document view 802 may use color coding or other visual indicators to highlight which chunks have been retrieved by the LLM 216 in response to validation prompts 214.

The response comparison view 804 may present a comparison between expected and actual responses generated by the LLM 216, enabling analysis of system performance. In some cases, the response comparison view 804 may display the validation prompts 214 alongside the corresponding LLM-generated responses. The response comparison view 804 may use highlighting or side-by-side comparisons to emphasize differences between expected and actual responses, facilitating quick identification of areas where the system may benefit from improvement.

The statistics view 806 may provide prompts and statistical data related to document coverage and system performance. In some cases, the statistics view 806 may display metrics such as document coverage percentages, entropy values for different prompts, and retrieval frequencies for various chunks. The statistics view 806 may include interactive charts and graphs that allow users to explore the data in more detail.

The graphical user interface 800 may arrange these views in a layout that facilitates analysis and comparison of document processing results. The document view 802 may occupy the left portion of the interface, while the response comparison view 804 and statistics view 806 may be positioned on the right side, with the statistics view 806 below the response comparison view 804. This arrangement may allow users to simultaneously monitor document content, compare responses, and review statistical metrics.

In some cases, the processing server 106 may compile coverage analysis and entropy calculations for display in the statistics view 806 of the graphical user interface 800. The processing server 106 may generate visualizations of metrics, such as bar charts showing document coverage percentages or heat maps illustrating entropy distributions across different prompts and documents. These visualizations may help users quickly identify patterns or anomalies in the data.

The graphical user interface 800 may also present actionable recommendations for system refinement, which may be created by the processing server 106 based on the analysis results. In some cases, these recommendations may be displayed in a dedicated section of the interface or as interactive tooltips associated with specific data points in the visualizations. The recommendations may suggest adjustments to document segmentation, prompt refinement, or embedding model updates to improve system performance.

The graphical user interface 800 may facilitate the presentation of generated reports to domain experts for review and feedback. In some cases, the interface may include collaboration features that allow multiple experts to annotate the report, add comments, or propose modifications to the system. The graphical user interface 800 may also provide tools for identifying cross-domain impacts and opportunities for collaboration, such as highlighting similar patterns or challenges across different document categories or subject areas.

Users may interact with the graphical user interface 800 to gather feedback on recommendations and potential adjustments. In some cases, the interface may include rating systems or feedback forms associated with each recommendation, allowing experts to prioritize or refine the suggested improvements. The graphical user interface 800 may also provide mechanisms for users to propose new prompts, suggest alternative document segmentation strategies, or flag potential issues for further investigation.

In the tax preparation company use case, the graphical user interface 800 may be utilized by tax experts to analyze and optimize the tax information retrieval system. The document view 802 may display a comprehensive range of tax documents, including IRS publications, tax codes, regulations, and frequently asked questions. The response comparison view 804 may show how the LLM 216 interprets and responds to queries about tax deductions, credits, or filing requirements, allowing tax experts to assess the accuracy and relevance of the system's outputs across different tax topics and taxpayer scenarios.

The statistics view 806 may present metrics on document utilization and information retrieval efficiency across various tax categories. For example, the view may reveal that documentation related to home office deductions has higher coverage and lower entropy in response to self-employment tax queries compared to documentation about foreign income reporting. Based on this analysis, the system may recommend adjusting the chunking strategy for international tax documents to improve retrieval performance for expatriate taxpayers.

Through the graphical user interface 800, tax experts from different specializations may collaborate on refining the system. They may use the interface to propose new validation prompts that better capture specific tax scenarios, suggest improvements to document segmentation strategies for complex tax code sections, or identify opportunities for connecting related tax concepts based on observed patterns in document usage and query responses.

By leveraging the comprehensive analysis and collaboration features of the graphical user interface 800, the tax preparation company may continuously improve its semantic search capabilities, ensuring that both taxpayers and tax preparers can quickly access accurate and relevant tax information, ultimately enhancing the efficiency and accuracy of tax preparation processes and improving overall taxpayer compliance and satisfaction.

The system described provides a practical solution to the complex problem of optimizing semantic search capabilities, particularly in specialized domains such as tax preparation. This solution addresses the challenge of efficiently retrieving relevant information from large, diverse document repositories by implementing a preemptive entropy reduction mechanism that iteratively improves vector embedding quality before search performance issues arise in production environments.

The system tackles the issue of information retrieval accuracy by focusing on three technical components: validation prompts with expected responses, document chunking strategies with variable granularity, and vector embedding optimization. By allowing domain experts to interact with the system through a graphical user interface 800, the solution enables continuous refinement of these components based on quantifiable entropy metrics and coverage analysis.

The iterative feedback mechanism solves the problem of system optimization by providing a structured method for identifying and addressing areas of suboptimal performance through statistical entropy analysis. By calculating document entropy with respect to chunks used in responses for each validation prompt and aggregating individual document entropies to determine total system entropy, the system can precisely identify problematic areas in the vector space. The report generator 226 compiles these metrics into visualizations that highlight specific chunks or documents contributing to high entropy. This data-driven approach allows for targeted technical refinements, such as adjusting chunk size parameters, implementing overlapping chunks for complex topics, fine-tuning embedding model dimensionality, or selectively pruning problematic documents from the vector space. The practical application of this solution leads to measurable improvements in semantic search accuracy and computational efficiency, as demonstrated in the tax preparation use case where the system optimizes the retrieval of tax regulations and deduction information by reducing entropy in the corresponding vector embeddings.

Figure 9:
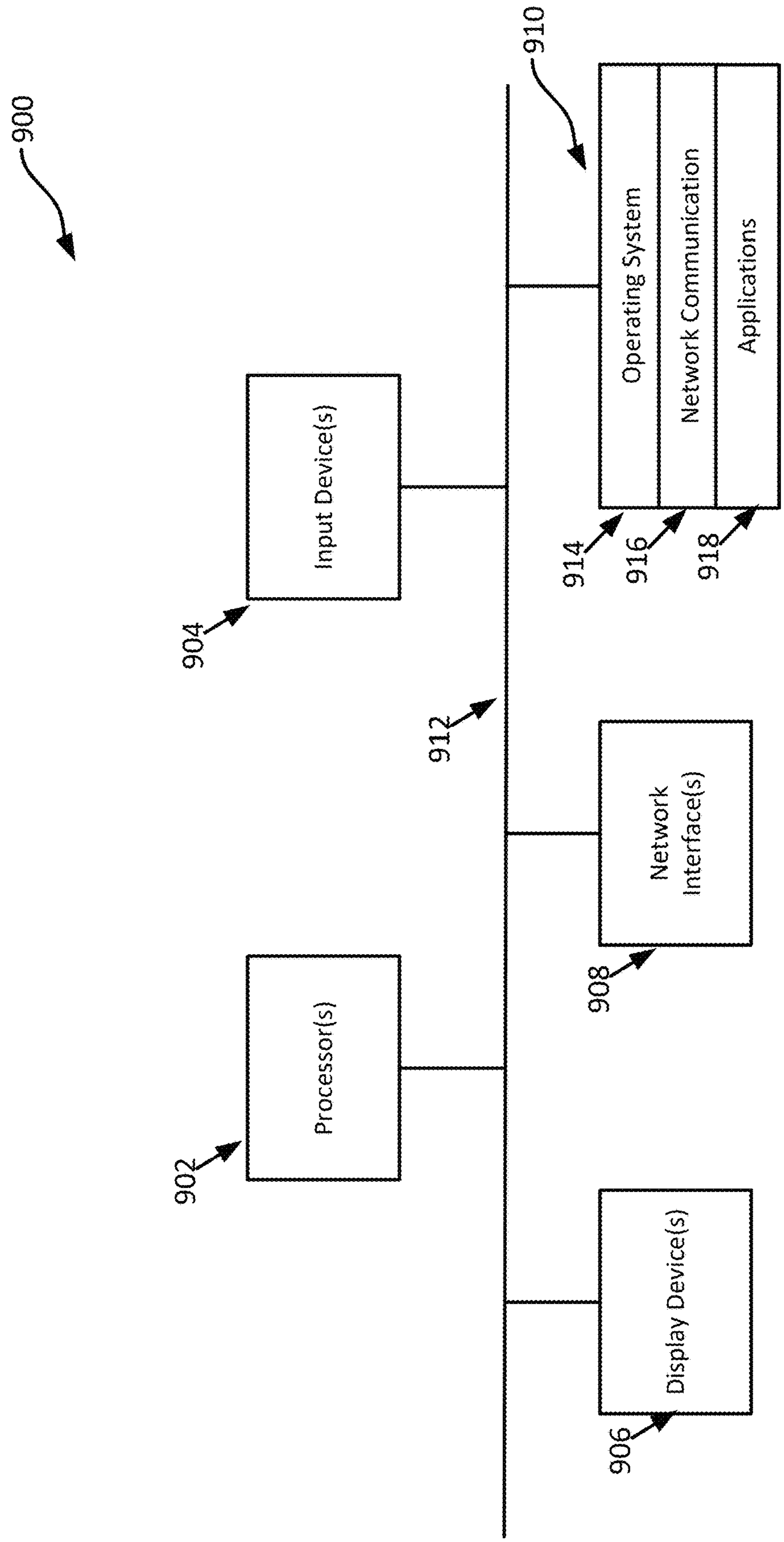
FIG. 9 illustrates a block diagram of a computing system, according to aspects of the present disclosure.

FIG. 9 illustrates a block diagram of a computing system 900 that may be used to implement the preemptive entropy reduction system for enhancing semantic search. The computing system 900 may include various hardware and software components that work together to support the functionality of the system.

A processor 902 may be the central processing unit of the computing system 900. The processor 902 may execute instructions and process data for the preemptive entropy reduction system. In some cases, the processor 902 may be responsible for tasks such as document segmentation, embedding generation, and entropy analysis.

An input device 904 may be included in the computing system 900. The input device 904 may allow users to interact with the system, input documents, and provide validation prompts. In some cases, the input device 904 may be a keyboard, mouse, touchscreen, or other interface device.

A display device 906 may be part of the computing system 900. The display device 906 may present visual output from the preemptive entropy reduction system, such as the graphical user interface 800 with its document view 802, response comparison view 804, and statistics view 806.

A network interface 908 may enable the computing system 900 to communicate with other components of the network system 100, such as the user device 102, the LLM 104, and the database server 108. In some cases, the network interface 908 may facilitate data exchange through the communication network 110.

The computing system 900 may include a software system 910 comprising multiple software modules. The software system 910 may implement the functionality of the preemptive entropy reduction system, including document processing, embedding generation, and entropy analysis.

A system bus 912 may provide a communication pathway between the hardware components and enable data transfer within the computing system 900. The system bus 912 may facilitate coordination between the processor 902, input device 904, display device 906, network interface 908, and software system 910.

An operating system 914 may be part of the software system 910. The operating system 914 may manage hardware resources and provide services to other software components. In some cases, the operating system 914 may handle tasks such as memory management, process scheduling, and file system operations for the preemptive entropy reduction system.

A network communication module 916 may be included in the software system 910. The network communication module 916 may handle network-related functions and communications through the network interface 908. In some cases, the network communication module 916 may manage data exchange with the LLM 104 and the database server 108.

An applications module 918 may be part of the software system 910. The applications module 918 may contain various software applications that implement the functionality of the preemptive entropy reduction system. In some cases, the applications module 918 may include components such as the document repository 204, the retrieval interceptor 220, and the coverage analyzer 222.

The computing system 900 may work in conjunction with other components of the network system 100 to implement the preemptive entropy reduction system. For example, the processor 902 may execute instructions from the applications module 918 to segment documents into chunks and prepare them for embedding.

The processing server 106 may select an embedding model for embedding the chunks into the vector space. In some cases, the processing server 106 may choose from various pre-trained models or custom-trained embeddings based on the specific requirements of the semantic search application.

The method may process each chunk through the embedding model to generate vector representations. In some cases, this may involve feeding the text of each chunk into the selected embedding model and obtaining a high-dimensional vector output that captures the semantic meaning of the chunk.

The processing server 106 may normalize the vector representations generated by the embedding model. In some cases, this normalization step may involve scaling the vectors to have unit length or applying other standardization techniques to ensure consistency across the vector space.

The computing system 900 may utilize its various components to support the embedding process. For example, the processor 902 may perform the computations required for generating and normalizing the vector representations, while the system bus 912 may facilitate the transfer of data between the processor 902 and the memory where the embedding model and chunk data are stored.

The network interface 908 and network communication module 916 may work together to retrieve necessary data from the database server 108 or send processed embeddings back for storage. The applications module 918 may contain the specific algorithms and procedures for selecting the appropriate embedding model, processing the chunks, and normalizing the resulting vectors.

Through the coordinated operation of these hardware and software components, the computing system 900 may efficiently implement the preemptive entropy reduction system, enabling enhanced semantic search capabilities across large document repositories.

While the foregoing is directed to example embodiments described herein, other and further example embodiments may be devised without departing from the basic scope thereof. For example, aspects of the present disclosure (e.g., modules) may be implemented in hardware or software or a combination of hardware and software. One example embodiment described herein may be implemented as a program product for use with a computer system. The program(s) of the program product defines functions of the example embodiments (including the methods described herein) and may be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid-state random-access memory) on which alterable information is stored. Such computer-readable storage media, when carrying computer-readable instructions that direct the functions of the disclosed example embodiments, are example embodiments of the present disclosure.

It will be appreciated by those skilled in the art that the preceding examples are not limiting. It is intended that permutations, enhancements, equivalents, and improvements thereto are apparent to those skilled in the art upon a reading of the specification and a study of the drawings are included within the true spirit and scope of the present disclosure. It is therefore intended that the following appended claims include such modifications, permutations, and equivalents as fall within the true spirit and scope of these teachings.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed:

1. A method for preemptive entropy reduction in vector embeddings to enhance semantic search, comprising:

receiving, by at least one processor, documents and a set of validation prompts;

segmenting, by the at least one processor, the documents into chunks;

embedding, by the at least one processor, the chunks into a vector space;

querying, by the at least one processor, a large language model (LLM) with the validation prompts;

intercepting, by the at least one processor, retrieved chunks of the chunks from the vector space in response to the validation prompts;

mapping, by the at least one processor, the retrieved chunks to their positions within the documents;

calculating, by the at least one processor, document coverage for the retrieved chunks, the document coverage indicating an amount of each document covered by the retrieved chunks;

calculating, by the at least one processor, individual document entropies with respect to the chunks used in response to the validation prompts based on the document coverage;

aggregating, by the at least one processor, the individual document entropies to calculate a total system entropy;

generating, by the at least one processor, a report compiling coverage analysis and entropy calculations; and iteratively refining, by the at least one processor, at least one of the validation prompts, document segmentation, or embedding process in response to the document coverage and the entropy in the report to reduce the entropy in the vector space until the total system entropy reaches a predetermined acceptable threshold prior to deployment of the semantic search.

2. The method of claim 1, wherein segmenting the documents into the chunks comprises:

analyzing document structure and content;

defining an optimal chunk size for the document structure and the content; and preserving metadata linking chunks to a document of the documents from which the metadata linking chunks were extracted.

3. The method of claim 1, wherein embedding the chunks into the vector space comprises:

selecting an embedding model;

processing each chunk through the embedding model to generate vector representations; and normalizing the vector representations.

4. The method of claim 1, wherein querying the LLM with the validation prompts comprises:

processing the validation prompts through the LLM to generate queries; and sending the generated queries to a vector database to retrieve relevant chunks.

5. The method of claim 1, wherein calculating the document coverage comprises:

determining a percentage of each document covered by the retrieved chunks;

identifying retrieval frequency of the retrieved chunks; and analyzing a distribution of the retrieved chunks across the documents.

6. The method of claim 1, wherein generating the report comprises:

generating visualizations of metrics; and creating actionable recommendations for system refinement.

7. The method of claim 6, further comprising:

presenting, by the at least one processor, the generated report to domain experts;

gathering, by the at least one processor, feedback on recommendations and potential adjustments; and identifying, by the at least one processor, cross-domain impacts and opportunities for collaboration.

8. The method of claim 7, wherein refining at least one of the validation prompts, the document segmentation, or the embedding process comprises:

implementing expert-approved changes to validation prompts;

adjusting document segmentation strategies; and modifying the embedding process for gathered insights.

9. The method of claim 8, further comprising:

re-running the method with refined inputs;

comparing, by the at least one processor, new results with previous iterations;

assessing, by the at least one processor, improvement in entropy and coverage metrics; and identifying, by the at least one processor, areas for further optimization.

10. A system for preemptive entropy reduction in vector embeddings to enhance semantic search, comprising:

an LLM server;

a database server;

a processing server configured to:

receive documents and a set of validation prompts, segment the documents into chunks, embed the chunks into a vector space, transmit the validation prompts to the LLM server configured to process the validation prompts and generate queries for retrieving the chunks from the database server, intercept retrieved chunks of the chunks from the database server in response to the LLM server queries, map the retrieved chunks to their positions within the documents, calculate document coverage for the retrieved chunks, the document coverage indicating an amount of each document covered by the retrieved chunks, calculate individual document entropies with respect to the chunks used in response to the validation prompts based on the document coverage, aggregate the individual document entropies to calculate a total system entropy, generate a report compiling coverage analysis and entropy calculations, and iteratively refine at least one of the validation prompts, document segmentation, or embedding process in response to the document coverage and the entropy in the report to reduce the entropy in the vector space until the total system entropy reaches a predetermined acceptable threshold prior to deployment of the semantic search; and a user interface configured to display the report and receive refinement inputs.

11. The system of claim 10, wherein to segment the documents into the chunks, the processing server is further configured to:

analyze document structure and content;

define an optimal chunk size for the document structure and the content; and preserve metadata linking the chunks to a document of the documents from which the metadata linking chunks were extracted.

12. The system of claim 10, wherein to embed the chunks into the vector space, the processing server is further configured to:

select an embedding model;

process each chunk through the embedding model to generate vector representations; and normalize the vector representations.

13. The system of claim 10, wherein the LLM server is configured to:

process the validation prompts to generate the queries; and send the generated queries to the database server to retrieve relevant chunks.

14. The system of claim 10, wherein to calculate the document coverage, the processing server is further configured to:

determine a percentage of each document covered by the retrieved chunks;

identify retrieval frequency of the retrieved chunks; and analyze a distribution of the retrieved chunks across the documents.

15. The system of claim 10, wherein to generate the report, the processing server is further configured to:

generate visualizations of metrics; and create actionable recommendations for system refinement for display on the user interface.

16. The system of claim 15, wherein the user interface is configured to:

present the generated report to domain experts;

gather feedback on recommendations and potential adjustments; and identify cross-domain impacts and opportunities for collaboration.

17. The system of claim 16, wherein to refine at least one of the validation prompts, the document segmentation, or the embedding process, the processing server is further configured to:

implement expert-approved changes to prompts received through the user interface;

adjust document segmentation strategies; and modify the embedding process for gathered insights.

18. The system of claim 17, wherein the processing server is further configured to:

re-run the entropy reduction process with refined inputs;

compare new results with previous iterations;

assess improvement in entropy and coverage metrics; and identify areas for further optimization for displaying on the user interface.

* * * * *